Nov. 26, 1940. W. NAECKER 2,222,627

COMPASS

Filed July 28, 1939 3 Sheets-Sheet 1

INVENTOR
WILLIAM NAECKER.
BY W Glenn Jones
ATTORNEY

Nov. 26, 1940.   W. NAECKER   2,222,627
COMPASS
Filed July 28, 1939   3 Sheets-Sheet 2

INVENTOR
WILLIAM NAECKER
BY
ATTORNEY

Nov. 26, 1940.　　　　　W. NAECKER　　　　　2,222,627
COMPASS
Filed July 28, 1939　　　3 Sheets-Sheet 3

INVENTOR
WILLIAM NAECKER
BY
ATTORNEY

Patented Nov. 26, 1940

2,222,627

UNITED STATES PATENT OFFICE 2,222,627

COMPASS

William Naecker, Suitland, Md.

Application July 28, 1939, Serial No. 287,077

4 Claims. (Cl. 33—223)

(Granted under the act of March 3, 1883, as amended April 30, 1928; 370 O. G. 757)

This invention relates to a compass especially intended for use on boats, and has for an object to provide improved details for making the compass card more permanent and less liable to deterioration and error.

A further object of this invention is to provide an improved float for the compass card which is less liable to leakage, more accurate, and more easily balanced and kept in balance than the present type of float.

A further object of this invention is to provide a compass float of much greater strength than the present type of compass float.

A further object of this invention is to provide an easier and simpler means for assembling and balancing the magnets and the float than is now possible.

A further object of this invention is to facilitate repair and upkeep on the compass on board ship, eliminating many of the trips back to the shop on shore.

With the foregoing and other objects in view, the invention consists in the construction, combination and arrangement of parts hereinafter described and illustrated in the drawings, in which.

Figure 1:
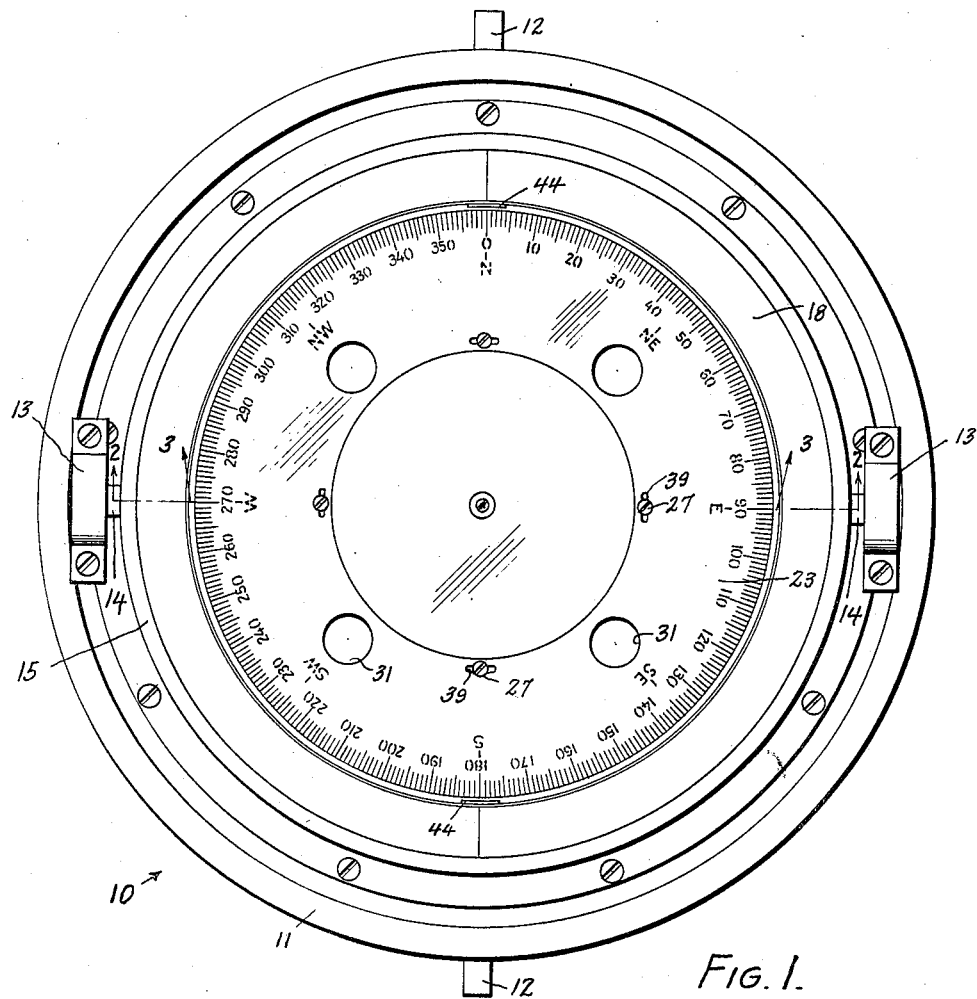
Fig. 1 is a top plan view of a compass in which is incorporated the improved features of this invention.

The compass generally shown at 10 includes an outer gimbal ring 11 having the conventional pivots 12 and provided with bearings 13 for the pivots 14 and the compass bowl 15. The compass bowl 15 includes the customary window 16 detachably secured in position by gasket 17 and ring 18. The bowl 15 also includes a conventional floor plate 20 through the center of which is secured the pivot pin 21 for supporting the compass float in the customary manner, all of the foregoing structure being old and conventional.

The bowl 15 is filled with the usual liquid, which liquid surrounds the float 22, the compass card 23, and the magnets 24, held in the clamps 25.

Figure 7:
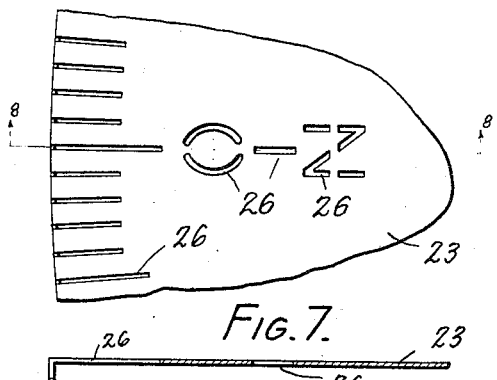
Fig. 7 is an enlarged fragmentary view of an edge of the compass card.
Figure 8:
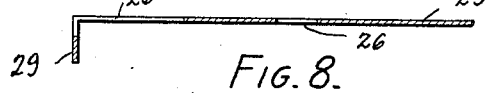
Fig. 8 is a sectional view on line 8—8 of Fig. 7.
Figure 6:
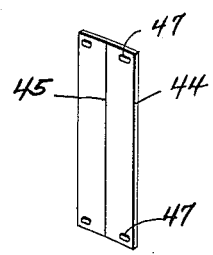
Fig. 6 is a perspective view of an index plate.
Figure 2:
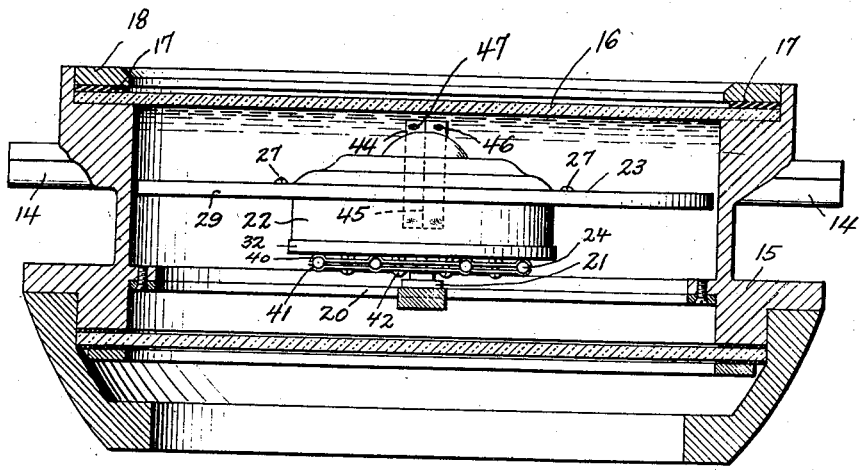
Fig. 2 is a partly sectional and partly elevational view of the compass bowl on line 2—2 of Fig. 1.
Figure 5:
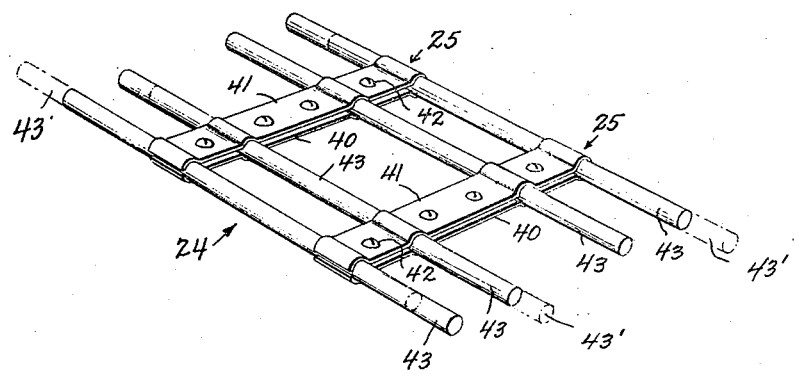
Fig. 5 is a perspective view of the compass magnet assembly.
Figure 4:
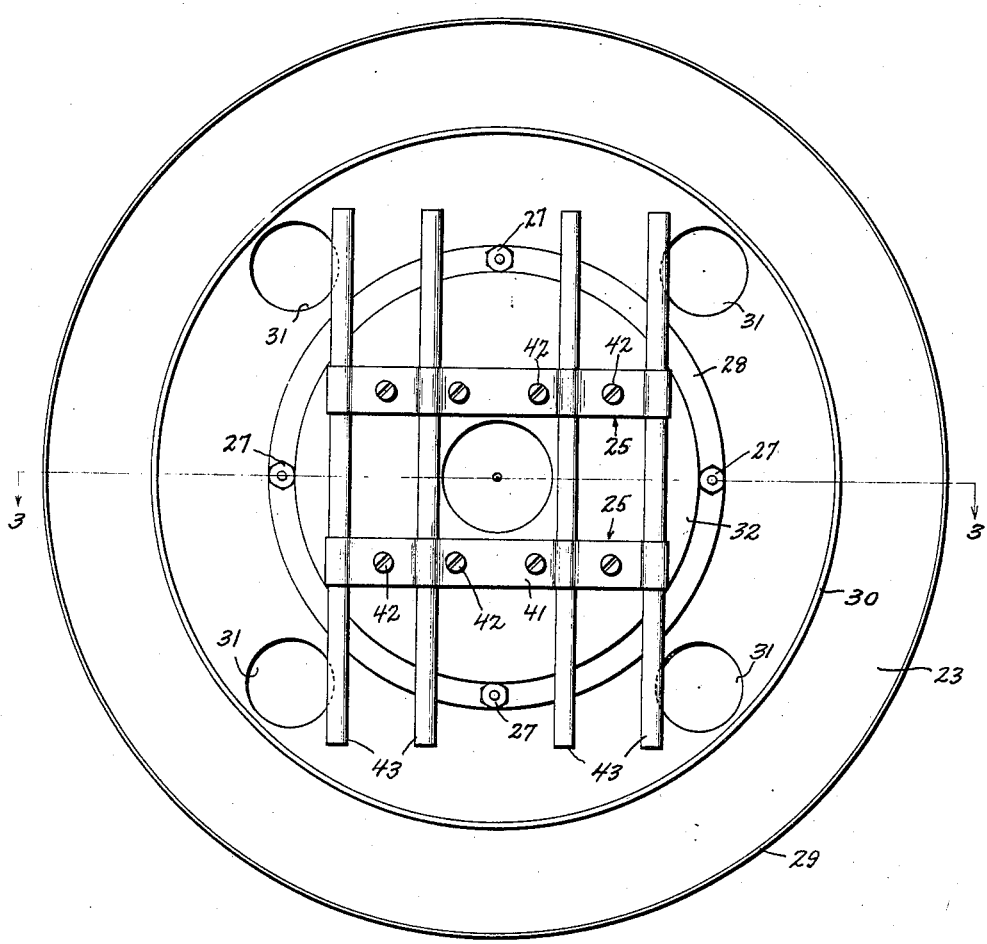
Fig. 4 is a bottom plan view of the compass float and card on line 4—4 of Fig. 3.
Figure 3:
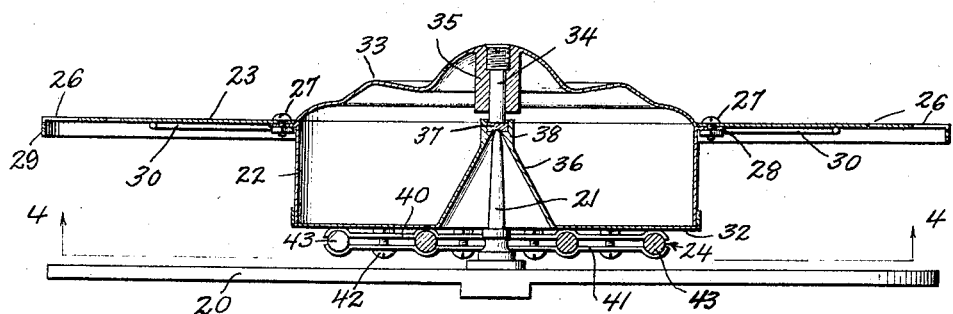
Fig. 3 is a sectional view of the compass float and card on lines 3—3 of Figs. 1 and 4.

The compass card 23, one of the features of this invention, is made of chromium plated sheet brass, preferably six one-thousandths of an inch thick, with the markings 26 engraved or cut completely therethrough in stencil style, as shown in Figs. 3, 7 and 8. The compass card 23 is secured by bolts and nuts 27 to a flange 28 extending from the float 22. If necessary to adjust the card indications relative to the magnet assembly, the bolt holes for the bolts and nuts 27 may be elongated as at 39. The card 23 is provided with a stiffening wire 30, soldered thereto at several points thereabout, and is further provided with a plurality of lightening holes 31, which also permit the free and easy flow of the compass liquid therethrough, thus cutting down the resistance of the card to the liquid. A downturned flange 29 also assists in stiffening the card 23.

The float 22 has a cup-shaped bottom 32 covered by a corrugated top 33. A stud 34 extending through a sleeve 35 in the top 33 extends through the float 22 to the apex of the flared mouth 36 centrally formed in the bottom 32 and carries a jewel 37 so as to support the float on the point of the pivot pin 21, the jewel 37 being located above the center of gravity of the float 22 and its assembled card, magnets and clamps. The stud 34 as thus inserted through the top is made leakproof relative to the bottom by means of a bushing 38 so that the float 22 is leakproof in this respect.

The clamps 25 each include one clamp plate 40 secured to the outside of the bottom 32 of the float 22, as by soldering, the other clamp plate 41 of each clamp 25 being securable thereto by means of small bolts and nuts 42 held between the clamp plates 41 and 42 of the clamps 25 by individual magnet bars 43 of the compass magnet 24. The magnet bars 43 may be adjusted and balanced relative to the float 22 by merely loosening the clamp plates 41 and sliding the magnet bars 43 as to the positions 43' until the float is properly balanced on the pivot pin 21, whereupon the clamp plates 41 are tightened to hold the magnet bars 43 in proper position relative thereto.

Affixed to the inside of the compass bowl 15 is an adjustable index line plate 44 having an index line 45 for cooperation with the markings 26 of the compass card 23. The index line plate 44 is secured in the bowl by screws 46 which pass through elongated holes 47 in the plate 44, thereby permitting the plate to be transversely shifted as may be necessary to bring it into proper alignment with the zero and 180 degree marks, as well as the pivotal support at the center.

Other modifications and changes in the proportions and arrangements of the parts may be made by those skilled in the art without departing from the nature of the invention, within the scope of what is hereinafter claimed.

The invention described herein may be manufactured and/or used by or for the Government of the United States of America for governmental purposes without the payment of any royalties thereon or therefor.

Having thus set forth and disclosed the nature of this invention, what is claimed is:

1. In a compass, a compass float assembly comprising a leakproof compass float, a compass card detachably secured to said float, a compass magnet comprising a plurality of individual magnet bars and clamping means for adjustably securing said individual magnet bars to the outside of the bottom of said float whereby said magnet bars may be individually longitudinally adjusted relative to said compass float upon loosening of said clamping means.

2. In a compass, a compass float assembly including a compass float, said compass float comprising a cupped bottom having a flared pivot pin-receiving mouth, a corrugated top extending above said cupped bottom in leakproof relation thereto, a pair of clamping plates affixedly secured to the outside of the bottom of said float, a pair of complementary clamping plates, a plurality of magnet bars, and means for detachably securing said second mentioned clamping plates to said clamping plates affixed to the float bottom with the plurality of magnet bars secured therebetween whereby said bars may be adjusted longitudinally upon loosening of said securing means.

3. In a compass, a compass card, a compass magnet comprising a pair of clamping members and a plurality of individual magnet bars secured adjustably relative to each other by said clamping members whereby said magnet bars may be individually longitudinally adjusted relative to said compass card upon loosening of said clamping means.

4. In a compass, a compass float assembly comprising a leakproof compass float, a compass card secured relative to said float for adjustment in azimuth relation thereto, a compass magnet comprising a plurality of individual magnet bars and clamping means for adjustably securing said individual magnet bars to the outside of the bottom of said float whereby said magnet bars may be individually longitudinally adjusted relative to said compass float upon loosening of said clamping means.

WILLIAM NAECKER.